(No Model.) F. G. SCHUERMAN. 6 Sheets—Sheet 1.
CORN HARVESTER.

No. 571,846. Patented Nov. 24, 1896.

(No Model.) 6 Sheets—Sheet 4.

F. G. SCHUERMAN.
CORN HARVESTER.

No. 571,846. Patented Nov. 24, 1896.

Witnesses.

Inventor
F. G. Schuerman
by Elliott & Hopkins Attys.

(No Model.)

F. G. SCHUERMAN.
CORN HARVESTER.

No. 571,846. Patented Nov. 24, 1896.

(No Model.) 6 Sheets—Sheet 6.
F. G. SCHUERMAN.
CORN HARVESTER.

No. 571,846. Patented Nov. 24, 1896.

Witnesses
Wm. F. Henning
Wm. M. Rheem

Inventor:
F. G. Schuerman
by Elliott & Hopkins Attys.

UNITED STATES PATENT OFFICE.

FREDERICK G. SCHUERMAN, OF TWIN BLUFFS, WISCONSIN.

CORN-HARVESTER.

SPECIFICATION forming part of Letters Patent No. 571,846, dated November 24, 1896.

Application filed January 2, 1895. Serial No. 533,647. (No model.)

*To all whom it may concern:*

Be it known that I, FREDERICK G. SCHUERMAN, a citizen of the United States, residing at Twin Bluffs, in the county of Richland and State of Wisconsin, have invented certain new and useful Improvements in Corn-Harvesters, of which the following is a full, clear, and exact specification.

My invention relates to machines for automatically cutting and gathering cornstalks and other analogous plants as they stand in the field, and subsequently depositing the same at intervals in the field in the form of shocks.

The primary object of my invention is to provide a machine of this nature which will automatically cut and collect the stalks and then readily deposit them upon the ground in the form of a shock.

In carrying out my invention I provide the forward part of the machine with the usual or any suitable knife or knives for severing the stalks near the ground, and forward of these knives I locate traveling fingers adapted to project transversely into the row of standing stalks and steady them while the knife advances, and after the stalks have been severed by the knife to deliver them upon the machine, whence they may be conveyed, preferably by hand, to folding platforms and leaned against opposite sides of a rest, the butts or lower ends of the stalks being supported by the folding platforms, which at the proper time may be caused to fold up under the said rest and permit the stalks to drop upon the ground in the form of a shock, the stalks being previously tied around their tops to hold them together.

With the described ends in view my invention consists in certain features of novelty in the construction, combination, and arrangement of parts by which the said ends and objects and certain other ends and objects hereinafter appearing are attained, all as more fully described with reference to the accompanying drawings, and more particularly pointed out in the claims.

In the said drawings, Fig. 1ª is an enlarged detail view hereinafter described.

Like signs of reference indicate like parts throughout the several views.

1 represents a beam or scantling which extends from the axle 2 of the forward pair of wheels 3 along the center of the machine throughout its entire length, and 4 5 represent two other scantlings or bars whose forward ends are brought into close proximity to the forward end of the scantling 1 and also supported upon the axle 2, while their rear ends diverge and are secured to the under side of a transverse beam 6, which latter takes its support at each end upon the side beams 7.

Secured to the under side of the beams 1 4 5 and also to the under side of the forward ends of the side beams 7 is the knife-platform 8, whose forward corners are cut away on an incline to give it a tapering form, and to each of these inclined or oblique edges is secured the stalk cutter or knife 9, which severs the stalks at a short distance from the ground as the machine advances.

Arranged transversely of the platform 8 is a shaft 10, which is preferably journaled to the under side of the beams 1 4 5 in an opening or slot in the platform 8, so that the lower side of the shaft 10 will not protrude below the platform and obstruct the progress of the machine by engaging with the stubble or other projections. This shaft 10 is driven by any suitable gearing, such as a sprocket-chain 11, passing around sprocket-wheels 12 13, secured to the shaft 10 and the hub of one of the main ground-wheels 14, respectively, and the purpose of said shaft is to operate the traveling stalk-gathering fingers before referred to. This gathering mechanism is preferably the same on each side of the machine, so that the machine may be driven along the field between two rows of stalks and will cut and gather the stalks of both rows at once. A description of the gathering mechanism on one side therefore will also suffice for that on the other.

Figure 8:
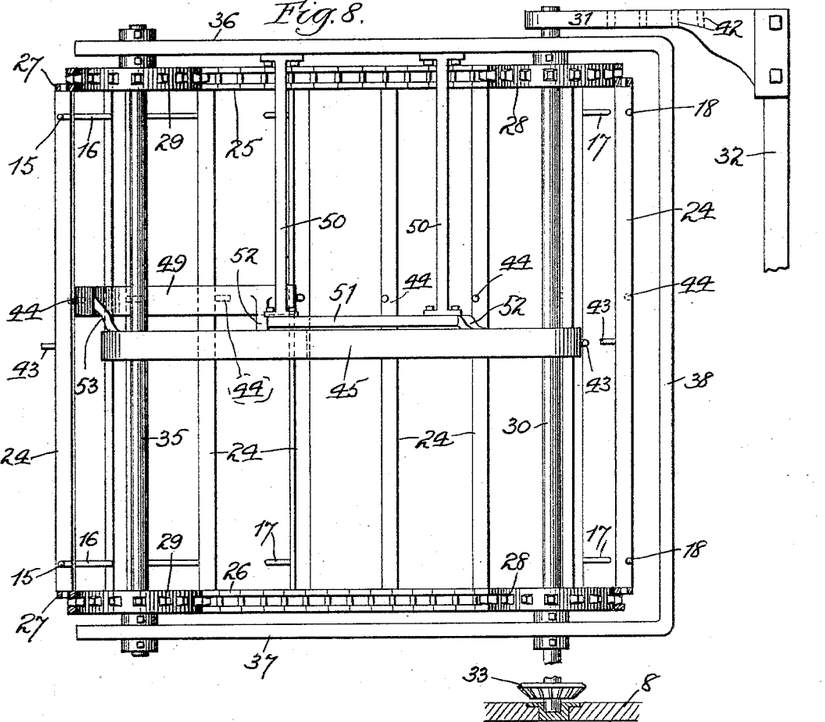
Fig. 8 is an enlarged detail view of one of the forward reels, showing the same in side elevation.

As the machine is driven along the field the traveling fingers 15 16 17 18 19 project between the stalks and hold them in an upright position while being severed by the knife 9, after which the said fingers convey the stalks rearwardly and deposit them at the rear side of the platform 8 in a corner formed by the side board or rail 20 and a spring-lever 21, the forward end of such lever being forced forward by a spring 22 or other suitable means, so as to hold the stalks in an upright position when but a few are on the platform 8 and yet yield rearwardly to allow others to be deposited. This lever 21 may be pivoted at 23 to the under side of the side rail 20, so as to support the stalks at a point slightly above the mid-length of the stalks of the maximum height. These gathering-fingers 15 16 17 18 19 are secured to vertical slats 24, one at or near each end thereof, as more clearly shown in Figs. 8 and 9, and these slats are pivoted on vertical axes to two sprocket-chains 25 26, the chains being provided with perforated ears 27, in which the reduced ends or pivots of the slats 24 are journaled. The chains 25 26 are supported one above the other, as shown in Fig. 8, by two pairs of sprocket-wheels 28 29. The sprocket-wheels 28 are secured to a vertical shaft 30, whose upper end is journaled in a bracket 31, fastened to an upright 32, while its lower end is stepped in the floor or platform 8 and receives its motion through the intermediary of a bevel-pinion 33, secured thereto, and a similar pinion 34, (see Fig. 4,) keyed to the shaft 10.

The sprocket-wheels 29 are secured to the lower and upper ends of a vertical shaft 35, which latter is carried by a pivoted frame consisting of upper and lower horizontal bars or members 36 37 and an upright connecting member 38, the shaft 30 passing through the bars 36 37 and constituting the pivot for the said frame. The purpose of this pivotal feature of the frame which carries the gathering and steadying fingers is to enable the operator to change the position or line of travel of the fingers with reference to the rows of stalks, whereby the frame may be controlled and projected into the rows of stalks notwithstanding any deviations from a straight line or from the line in which the machine happens to be traveling.

To the end that the relative position of the finger-carrying frame may be thus under the control of the operator I provide said frame with a controlling-rod 39, which is pivoted to an arm or lever 40, formed, preferably, on the upper member 36 of the frame, the inner end of the rod 39 being provided with a pin or catch 41, adapted to be engaged in any one of a number of sockets 42, formed in the bracket 31, whereby the finger-carrying frame when adjusted to the proper position may be readily locked in place.

Figure 1:
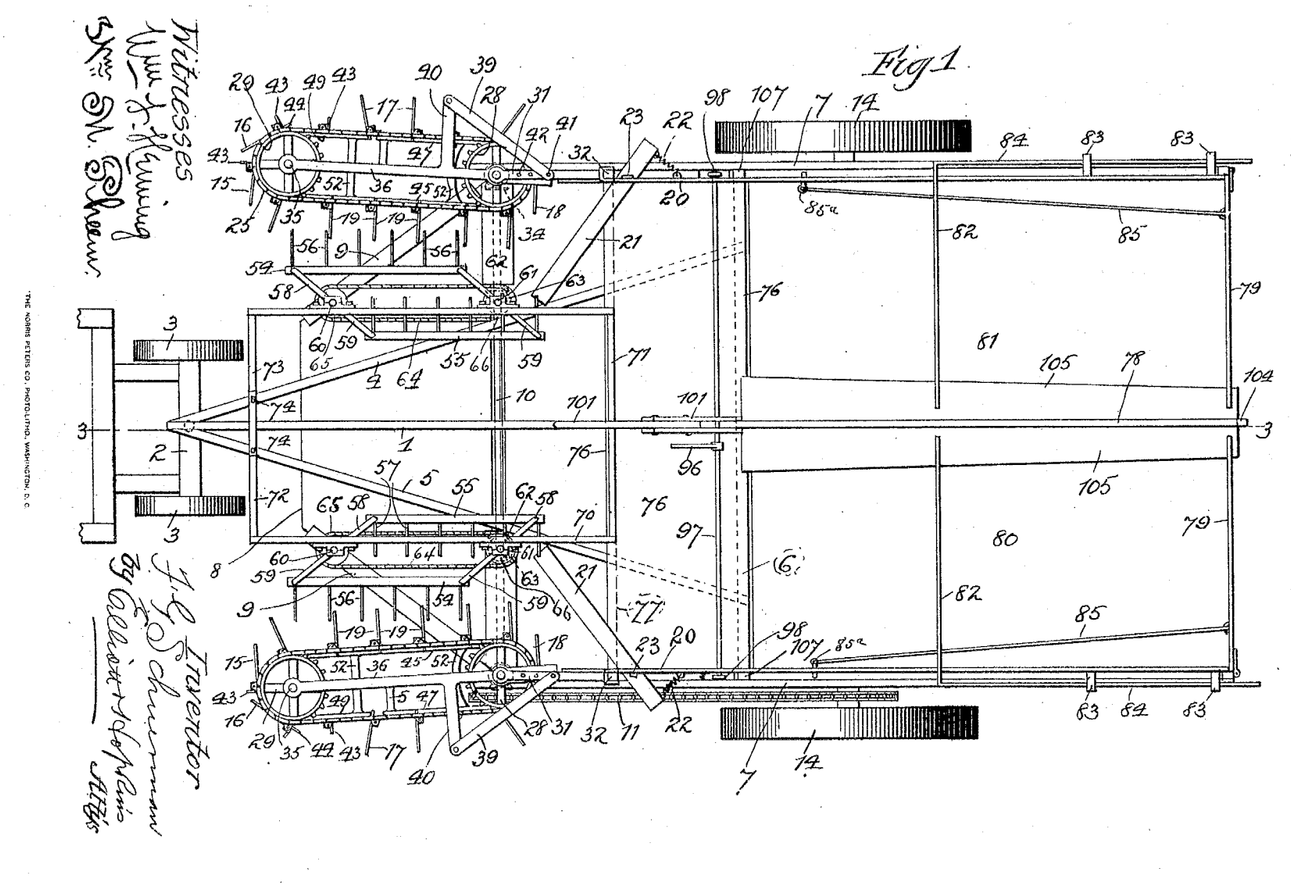
Figure 1 is a plan view of my improved machine.
Figures 2, 2A:
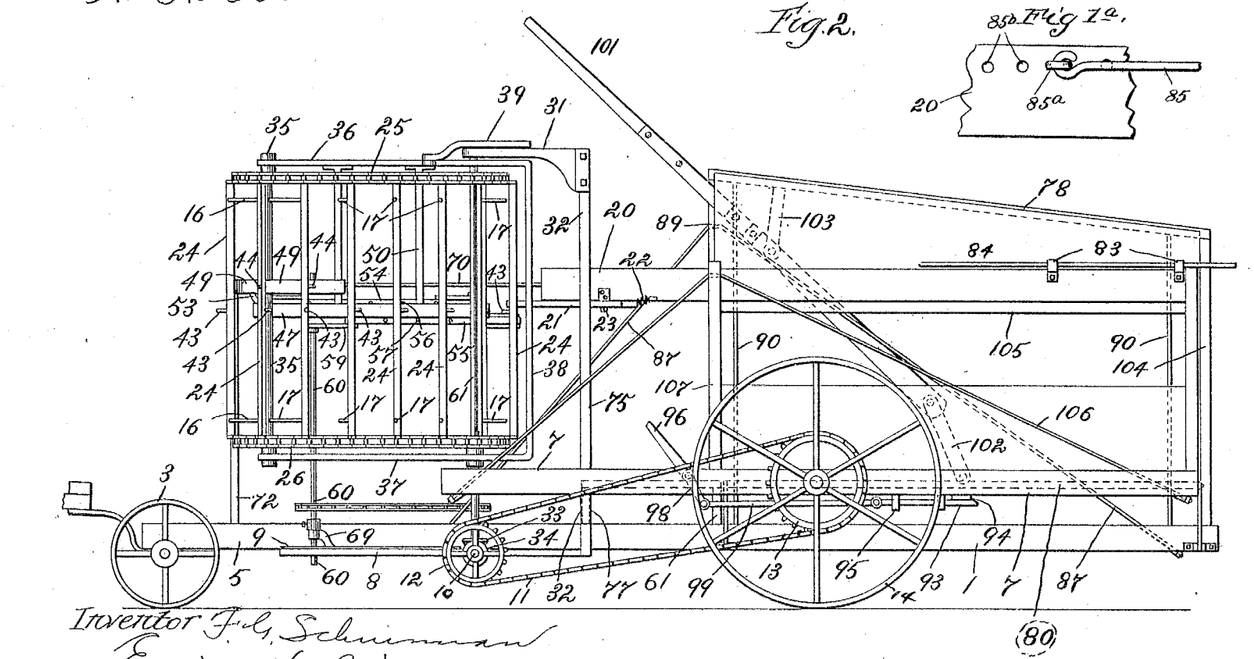
Fig. 2 is a side elevation thereof.
Figure 3:
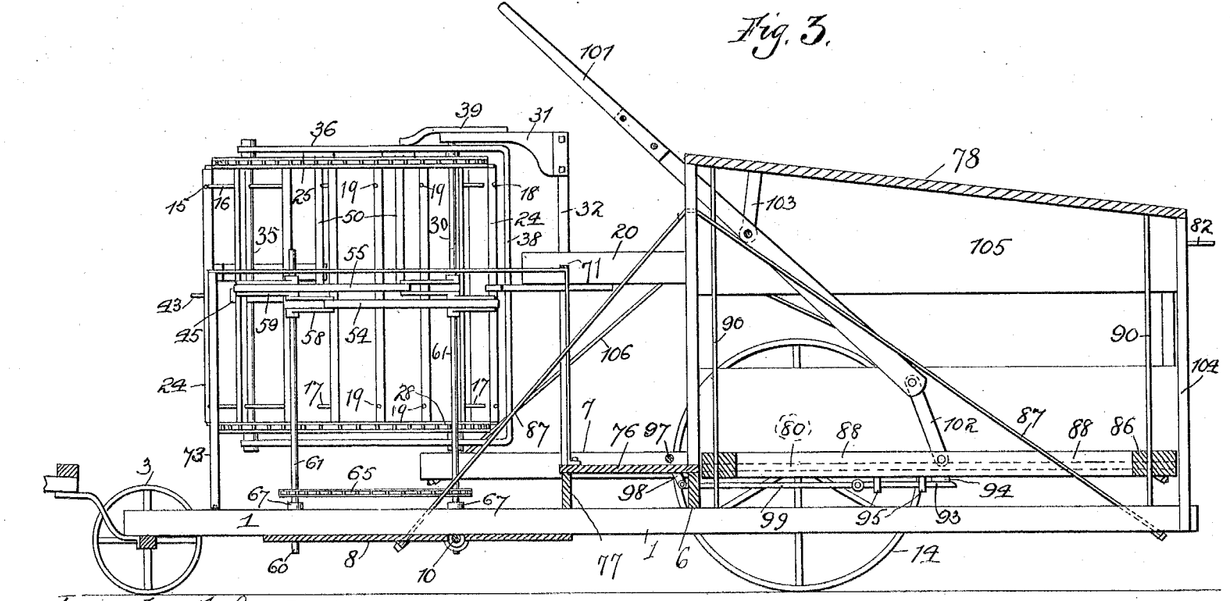
Fig. 3 is a vertical longitudinal sectional view taken on the line 3 3, Fig. 1.
Figure 9:
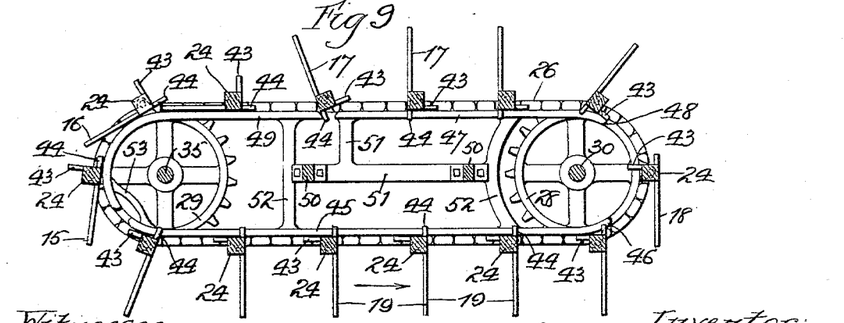
Fig. 9 is a plan section thereof, taken on the line 9 9, Fig. 8.

In order that the gathering-fingers 15 16, &c., may not whip the stalks or sweep against them too violently as they pass around the forward sprocket-wheels 29, I cause such fingers, when arriving at this point, to enter the row of stalks transversely of such row, so as to project between the stalks endwise in the position assumed by the finger 15, as shown more clearly in Figs. 1 and 9 of the drawings, and to then travel rearwardly while in a position substantially transverse to the row of stalks and to the line of travel of the machine, as shown at 19 in Figs. 1 and 9, and after the fingers 19 have conveyed the stalks to a point adjacent to the lever 21 I cause them to pass out around the sprocket-wheels 28 in a line substantially transverse to the line of travel of the machine in order that they will not whip against the stalks collected and result in damage to both the stalks and themselves. These described movements of the gathering-fingers may be best accomplished by the mechanism more clearly shown in Figs. 8 and 9. From these figures it will be seen that each of the pivoted slats 24 is provided with two lugs or projections 43 44, which extend at substantially right angles to each other and are arranged at different elevations in the height of the slat. Arranged along the line of travel of the lugs 43, just inside the slats 24, so that the latter will rest against it, is a track or rail 45, which extends substantially throughout the distance which it is desired that the fingers shall travel rearwardly while substantially transverse to the line of travel of the machine, and against which rail the lugs 43 bear, as shown in Fig. 9, and prevent the pressure of the stalks from deflecting the fingers 19 forwardly. This track or rail 45, however, terminates at 46 and leaves the fingers free to assume the position shown at 18 when rounding the rear sprocket-wheels 28, so that they will pass out of the stalks collected against the lever 21 in substantially an endwise direction.

After the fingers have withdrawn from the collected stalks and rounded the sprocket-wheels 28 it is desirable to throw their outer ends forward in order that they may enter the row of stalks, when rounding the forward sprocket-wheels 29, in substantially an endwise direction, as shown at 16 and 15. To accomplish this, I arrange on the side opposite the track 45 another track 47, against whose beveled end 48 the lugs or projections 43 strike as they round the sprocket-wheels 28. This throws the fingers into a transverse position and brings the lugs 44 on the slats into line with, so as to strike against, the end of a track or rail 49, arranged, like the tracks 45

47, just inside the path of the slats 24. When the lugs 44 strike the track 49, the fingers are first tipped into the position shown at 17 and then thrown inward, so as to travel endwise, and since the track 49 extends nearly around the forward side of the forward sprocket-wheels 29 it will be seen that the fingers in entering the row of stalks will project first in the position shown at 16 and then in the position shown at 15, substantially transverse to the line of travel of the machine, but passing endwise between the stalks. When the lugs 44 leave the end of the track or rail 49, the pressure of the stalks against the fingers tends to deflect the latter in the opposite direction to the movement of the fingers, and this pressure of the stalks therefore throws the lug or projection 43 against the end of the track 45, which latter holds the fingers at right angles to the line of travel, as already described. These tracks 45 47 49 may be suspended from the member 36 by means of hangers 50, which are suitably secured to a web 51, having branches 52 secured to or formed on the tracks, the forward ends of the tracks 45 49 being, if desired, secured together by a brace 53.

Figure 4:
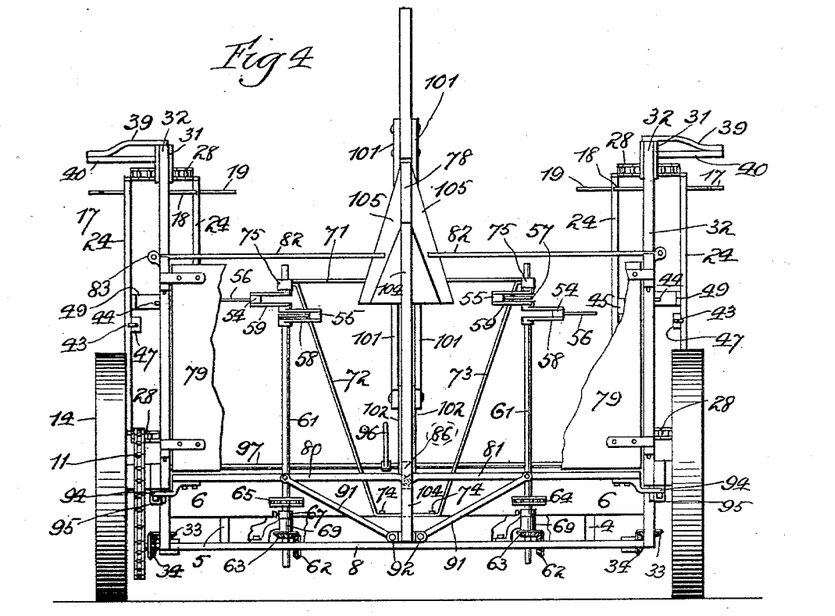
Fig. 4 is a rear view showing the rear doors and other parts broken away.

Under ordinary circumstances the gathering-reels having the fingers 15 16, &c., which I have already described, are sufficient to steady the stalks and prevent them from being broken down by the knives, and after being cut to force them back onto the platform 8; but in order to provide for the contingency of the stalks being partially felled by wind or other cause and to guard against the possibility of their falling sidewise away from the chains 25 26 after being cut by the knives I arrange opposite each of the reels described a guard or auxiliary gathering device, having the bars 54 55 and gathering-fingers 56 57, respectively. These bars 54 55 are arranged substantially parallel with the chains 25 26 and with each other and are located at an elevation substantially midway between the upper and lower fingers 15 16, &c., on the slats 24, and they are given a revolving motion, so as to alternately approach the slats 24 and force their fingers 56 57 into engagement with the stalks and move such stalks along in unison with the fingers on the slats 24, the bars 54 55 thus serving as guards to prevent the stalks from falling out of engagement with the fingers 19, the latter fingers and the fingers 56 being of sufficient length to project beyond or in between each other. This revolving movement of the bars 54 55 is best produced by a pair of oppositely-projecting cranks 58 59, formed in or secured to each of the two upright shafts 60 61, the cranks on each of the shafts being arranged one above the other, as clearly shown in Fig. 4, so that the bars 54 55 in making their revolutions will pass one under the other and alternately approach and recede from the slats 24 of the reel. It is understood of course that one end of the bar 54 is pivoted to the crank 58 on one of the shafts 60 61, while its other end is pivoted to the crank 58 on the other of such shafts, while the bar 55 is pivoted at its opposite ends to the cranks 59, respectively.

The shafts 61 derive their rotary motion from bevel-gears 62, secured to the transverse shaft 10 and meshing with similar gears 63, secured on the shafts 61, and the motion of each of the shafts 61 is imparted to each of the shafts 60 through the medium of a sprocket chain belt 64, passing around sprocket-wheels 65 66, secured to the shafts 60 61, respectively.

In order that the fingers 56 57 may be raised and lowered to adapt the device for stalks of various height, I make the shafts 60 61 adjustable vertically. This may be accomplished by providing each of them with a collar 67, secured thereto by set-screws 68 and resting upon the bracket 69, in which the lower end of each of the shafts 60 61 is journaled, the bracket 69 being secured to the platform 8.

The upper ends of the shafts 60 61 on each side of the machine are journaled in suitable boxes, as shown in Fig. 1, secured to a bar or rail 70. The rear ends of these bars or rails 70 are connected by a cross-bar 71, while their forward ends are connected and supported by two incline braces 72 73, whose lower ends are secured by bolts 74 to the beams 4 5, as more clearly shown in Fig. 4. The rear end of the rectangular frame thus formed is supported by two uprights 75, whose lower ends rest upon the operator's platform 76. The forward side of this platform 76 is supported upon a cross-beam 77, which is a companion to the beam 6, arranged in the same plane therewith and secured at its ends to the side members 7, while the rear side of such platform 76 is supported by the beam 6.

An operator stands on each end of the platform 76 and conveys the stalks, after a sufficient number of them have collected against the lever 21, to the rear end of the machine and leans them against the central support 78 in the corner formed on each side of the machine by such support and a pair of doors 79, the flooring of this rear portion of the machine being constituted by the two folding platforms 80 81 before referred to. In order that the stalks may be held in place against the doors 79, each side of the machine is provided with an adjustable bar 82, which is capable of being lifted to permit the operator to pass to the rear of the machine and then forced rearwardly against the stalks. Each of these bars is supported in a horizontal position at one end by resting upon a portion of the central support 78, and at its other end by two eyes or perforated ears 83, secured to the side of the machine and supporting a longitudinal rod 84, which forms a part of each of the bars 82 and permits of the latter's adjustment.

Figure 5:
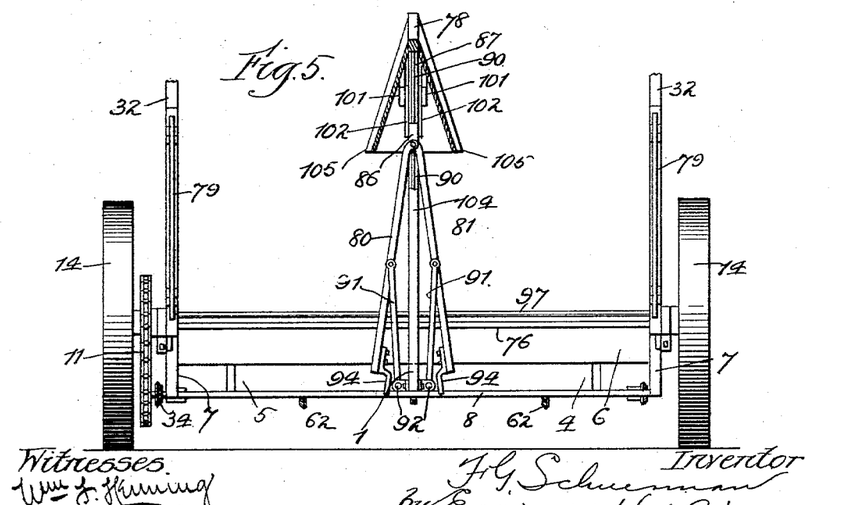
Fig. 5 is a rear elevation showing the doors open and the platforms folded up or together under the rest, which latter is shown in section, the forward mechanism being omitted for the sake of clearness.
Figure 7:
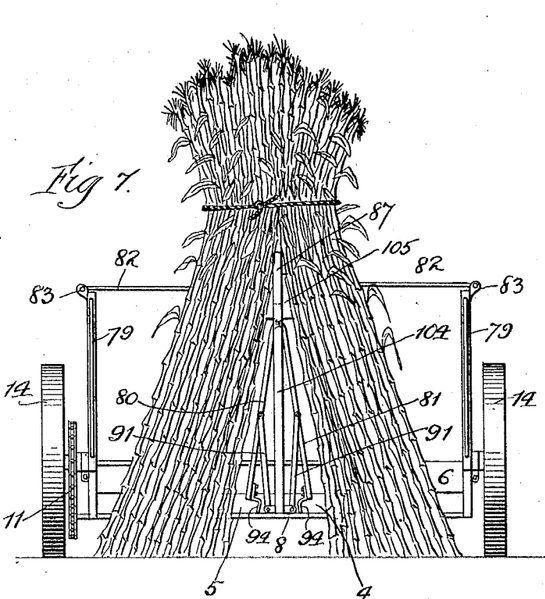
Fig. 7 is a similar view showing the parts in the position they assume after the shock has been dropped.

The platforms 80 81 are designed to fold up in the position shown in Figs. 5 and 7 to permit the shock of stalks to drop onto the ground after having been tied around the top. The rear doors 79 are then thrown open and the machine driven away, leaving the shocks standing in the field. In order that the doors 79 may be thus manipulated from the forward part of the machine, they are each provided with an operating-rod 85, pivoted thereto at one end and having its other end detachably secured to the side of the machine in any convenient manner, the means shown consisting of a pin 85ª, engaging in one of a series of holes 85ᵇ in the rail 20, as indicated in Figs. 1 and 1ª.

The platforms 80 81 are hinged to a vertically-sliding beam 86, which, in order to make room for a central brace-rod 87, which supports the rear end of the central timber or beam 1, is slotted longitudinally, as shown at 88. The brace-rod 87 passes in an incline direction from the rear end of the beam 1 up through a standard 89, and then passes downward again to the beam 1.

The slotted beam 86 is preferably guided in its vertical movement by means of two vertical guide-rods 90, the lower end of each of which is planted in the main timber 1, while its upper end is secured to the central rest or support 78.

The folding platforms 80 81 are caused to assume a horizontal position by means of links or braces 91, pivoted at their upper ends to the platforms and at their lower ends by ears 92 to the sides of the beam 1. Thus it will be seen that after the platforms have been folded up in the position shown in Figs. 5 and 7 and the beam 86 is again allowed to descend, the links or braces 81 will act as levers to force the lower and outer edges of the platforms upward until the downward movement of the beam 86 ceases and the platforms assume a horizontal position. When in this horizontal position, they may be securely locked in place by means of sliding bolts 93, arranged one on each side of the machine and adapted to engage under a projection 94, secured to the outer side of each of the platforms. These bolts 93 are arranged to slide in keepers 95, and they may be withdrawn or advanced simultaneously by means of a lever 96, secured to a rock-shaft 97, projecting across the machine just above the platform 76, and having at each end a depending crank-arm 98, connected to the bolt 93 by a link 99.

The inner edges of the platforms 80 81 are located at a slight distance apart and hinged together by means of the downwardly-curved ears 100, so that the space between them will exist even when folded up in the position shown in Fig. 5, and the platforms will therefore be prevented at all times from binding on the brace-rod 87 or on the guide-rods 90.

Vertical movement is imparted to the sliding beam 86 by means of a hand-lever 101, whose lower end is bifurcated or formed in two parts, so as to straddle the brace-rod 87, and is pivoted to the sliding beam 86 at about the mid-length of the latter by means of two links 102, each connected to one of the branches of the lever 101 and one side of the beam 86, respectively. This lever 101 is also bifurcated for the further purpose of straddling the standard 89, the lever being preferably fulcrumed or supported upon the beam 78 of the central support by means of a depending hanger 103.

The beam 78 of the central support or rest is supported at its forward end by the standard 89, while its rear end is supported by an upright 104, which is planted in the beam 1.

Figure 6:
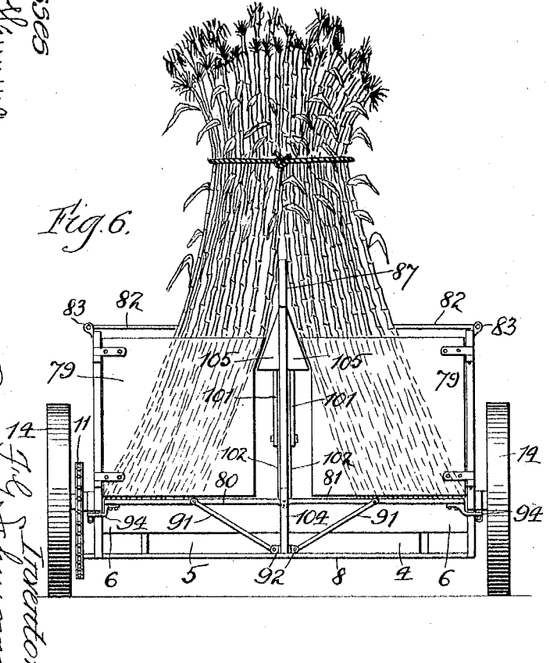
Fig. 6 is a rear elevation, on a smaller scale, showing a shock ready to be dropped into the field.

The beam 78 or the upper side of the central support or rest is inclined from front to rear in order that it may readily slide out of the shock, and in order that the fodder and stalks may not become entangled in the lever 101 and other parts of the mechanism immediately under the beam 78 I provide such beam with a roof or shield 105, under which the lever 101 and the inner edges of the platforms 80 81 operate, the stalks being leaned against the sides of such roof or shield, which are inclined in the manner shown in Fig. 6; and in order that this roof or shield may also readily disengage itself from the shock when the latter is dropped on the ground and the machine driven on it is tapered in plan view from front to rear.

The ends of the side members 7 are supported by brace-rods 106, similar to the brace-rods 87, which brace-rods 106 pass upward through standards 107, upon which the said brace-rods 106 and other parts of the side frame are supported.

Having thus described my invention, what I claim as new therein, and desire to secure by Letters Patent, is—

1. A stalk-harvesting machine having in combination a pair of hinged platforms having a space between them, a beam arranged along under said space, a brace-rod extending through said space and supporting the end of said beam, a vertically-sliding slotted beam to which said platforms are connected and through which said brace-rod extends, a lever for elevating said slotted beam, and pivoted braces secured to said first beam and to said platforms, substantially as set forth.

2. A stalk-harvesting machine having in combination a pair of platforms, a vertically-sliding, slotted beam to which said platforms are hinged, a beam arranged under said platforms, a brace-rod extending through said slotted beam and platforms and supporting said second beam, inclined braces pivoted to said platforms and latter beam, and a two-part or slotted lever straddling said brace-rod and being connected to said slotted beam for elevating it, substantially as set forth.

3. A stalk-harvesting machine having in combination the main beam 1, the beam 78, the standards or uprights 89 104 supporting the beam 78 upon the beam 1, the guide-rods 90 supported by said beams 1 and 78, a beam arranged to slide on said rods, a pair of hinged platforms connected to said sliding beam, for supporting the stalks, and means for raising and lowering said sliding beam, substantially as set forth.

4. A stalk-harvesting machine having in combination a stalk-cutting knife, traveling belts, slats pivoted to said belts and being provided with fingers, projections 43 on said slats, the tracks or rails 45 47, extending along the sides of said belts and having a space between their rear ends and being arranged to engage with said projections 43, projections 44 on said slats and the track or rail 49 adapted to engage with said projections 44 and extending around the forward ends of said belts, for throwing said fingers lengthwise of their line of movement when engaging the stalks, substantially as set forth.

5. A stalk-harvesting machine having in combination a pair of pivoted platforms for supporting the stalks, said platforms being hinged permanently at a distance apart so as to at all times have a space between them, the beam extending along and under the contiguous edges of said platforms, an inclined brace-rod extending through said space between said platforms and supporting the ends of said beam, inclined braces pivoted to said beam and to said platforms, means for locking the outer ends of said platforms against movement when horizontal, means for elevating the contiguous edges of said platforms, and vertical guides for the contiguous edges of said platforms, substantially as set forth.

6. A stalk-harvesting machine having in combination a pair of upwardly-folding platforms for supporting the stalks, means for elevating the adjacent edges of said platforms, and a longitudinal rest arranged over and parallel with the contiguous edges of said platforms, said rest being tapered rearwardly and also inclined downwardly from front to rear, whereby said rest will have a tendency to cause the stalks to slide toward the rear end of the rest, substantially as set forth.

7. A stalk-harvesting machine having in combination the main beam 1, means for supporting the same at its rear end, a rest arranged over said beam, the standards or uprights supporting said rest upon said beam, a pair of hinged platforms for supporting the stalks, vertical guides arranged at the ends of the inner edges of said platforms for guiding them in a vertical direction, and a lever arranged over the inner edges of said platforms and connected therewith, substantially as set forth.

FREDERICK G. SCHUERMAN.

Witnesses:
J. S. KANEY,
M. L. REED.